US012378067B2

(12) United States Patent
Salinas et al.

(10) Patent No.: US 12,378,067 B2
(45) Date of Patent: Aug. 5, 2025

(54) REFUSE VEHICLE DUMP VERIFICATION SYSTEM AND APPARATUS

(71) Applicant: The Heil Co., Chattanooga, TN (US)

(72) Inventors: Ricardo Castano Salinas, Fort Payne, AL (US); Brian Huston Ham, Huntsville, AL (US); Henry Michael Hund, Jr., Cedar Bluff, AL (US); John Forrest Smith, Fort Payne, AL (US)

(73) Assignee: The Heil Co., Chattanooga, TN (US)

( * ) Notice: Subject to any disclaimer, the term of this patent is extended or adjusted under 35 U.S.C. 154(b) by 0 days.

(21) Appl. No.: 18/151,357

(22) Filed: Jan. 6, 2023

(65) Prior Publication Data

US 2023/0159269 A1 May 25, 2023

Related U.S. Application Data

(63) Continuation of application No. 16/857,681, filed on Apr. 24, 2020, now Pat. No. 11,548,730, which is a continuation of application No. 15/611,986, filed on Jun. 2, 2017, now Pat. No. 10,633,180.

(60) Provisional application No. 62/348,537, filed on Jun. 10, 2016.

(51) Int. Cl.
*B65F 3/02* (2006.01)

(52) U.S. Cl.
CPC .......... *B65F 3/02* (2013.01); *B65F 2003/022* (2013.01); *B65F 2003/0223* (2013.01); *B65F 2003/0279* (2013.01); *B65F 2210/124* (2013.01); *B65F 2210/128* (2013.01); *B65F 2210/138* (2013.01)

(58) Field of Classification Search
CPC .................. B65F 3/02; B65F 2210/128; B65F 2003/0223; B65F 2210/138; B65F 2003/0279; B65F 2210/124; B65F 2003/022
See application file for complete search history.

(56) References Cited

U.S. PATENT DOCUMENTS

| | | | |
|---|---|---|---|
| 4,260,316 | A | 4/1981 | Gollnick |
| 4,714,122 | A | 12/1987 | Appleton et al. |
| 4,854,406 | A | 8/1989 | Appleton et al. |
| 5,062,759 | A | 11/1991 | Pieperhoff |
| 5,636,122 | A | 6/1997 | Shah et al. |
| 5,837,945 | A | 11/1998 | Cornwell et al. |
| 5,890,865 | A | 4/1999 | Smith et al. |
| 8,092,141 | B2 | 1/2012 | Curotto et al. |
| 9,403,278 | B1 | 8/2016 | Van Kampen et al. |

(Continued)

FOREIGN PATENT DOCUMENTS

| | | |
|---|---|---|
| CA | 2918411 | 9/2016 |
| EP | 3483092 | 5/2019 |

(Continued)

OTHER PUBLICATIONS

CA Office Action issued in Canadian Application No. 2,969,939, dated Oct. 4, 2018, 4 pages.

(Continued)

*Primary Examiner* — Jason Holloway
(74) *Attorney, Agent, or Firm* — Fish & Richardson P.C.

(57) ABSTRACT

A method and device for positively identifying that a dump event of a refuse container has occurred into a refuse hopper of a refuse vehicle are provided. When used with route software, alerts may be generated if a specific refuse container is missed or if an unexpected dump event occurs during the route.

20 Claims, 4 Drawing Sheets

(56) References Cited

U.S. PATENT DOCUMENTS

| | | | |
|---|---|---|---|
| 9,884,585 | B1 | 2/2018 | Lubbers |
| 10,633,180 | B2 | 4/2020 | Salinas et al. |
| 10,692,220 | B2 | 6/2020 | Gao et al. |
| 10,706,587 | B1 | 7/2020 | Sorgi et al. |
| 10,721,375 | B1 | 7/2020 | Boyd et al. |
| 11,010,903 | B1 | 5/2021 | Gallaudet et al. |
| 11,144,066 | B1 | 10/2021 | Ebrahimi Afrouzi |
| 11,222,491 | B2 | 1/2022 | Romano et al. |
| 11,580,799 | B2 | 2/2023 | Romano et al. |
| 11,615,275 | B2 | 3/2023 | Swaroop et al. |
| 11,816,940 | B2 | 11/2023 | Romano et al. |
| 11,875,301 | B2 | 1/2024 | Romano et al. |
| 12,073,669 | B2 | 8/2024 | Romano et al. |
| 12,080,040 | B2 | 9/2024 | Swaroop et al. |
| 2002/0159870 | A1 | 10/2002 | Pruteanu et al. |
| 2003/0031543 | A1 | 2/2003 | Elbrink |
| 2009/0092284 | A1 | 4/2009 | Breed et al. |
| 2009/0306863 | A1 | 12/2009 | Curotto et al. |
| 2011/0036738 | A1 | 2/2011 | Hilt1 |
| 2011/0068954 | A1 | 3/2011 | McQuade et al. |
| 2011/0116899 | A1 | 5/2011 | Dickens |
| 2011/0188976 | A1 | 8/2011 | Rowland et al. |
| 2011/0190942 | A1 | 8/2011 | Nicholson et al. |
| 2011/0210124 | A1 | 9/2011 | Da Silva et al. |
| 2013/0039728 | A1 | 2/2013 | Price et al. |
| 2013/0083330 | A1 | 4/2013 | Piana et al. |
| 2013/0215270 | A1 | 8/2013 | Murashita et al. |
| 2013/0251485 | A1 | 9/2013 | Howell et al. |
| 2013/0260448 | A1 | 10/2013 | Wilson et al. |
| 2013/0313419 | A1 | 11/2013 | Nakazawa et al. |
| 2014/0239059 | A1 | 8/2014 | Flood et al. |
| 2014/0270495 | A1 | 9/2014 | Tu et al. |
| 2014/0343801 | A1 | 11/2014 | Whitfield, Jr. et al. |
| 2014/0379588 | A1 | 12/2014 | Gates et al. |
| 2015/0139536 | A1 | 5/2015 | Jin et al. |
| 2015/0348252 | A1 | 12/2015 | Mask |
| 2016/0232719 | A1 | 8/2016 | Brinig et al. |
| 2017/0237949 | A1 | 8/2017 | Wang et al. |
| 2017/0293800 | A1 | 10/2017 | Babenko et al. |
| 2017/0332199 | A1 | 11/2017 | Elliott et al. |
| 2017/0345169 | A1 | 11/2017 | Rodoni |
| 2017/0355522 | A1 | 12/2017 | Salinas et al. |
| 2017/0362030 | A1 | 12/2017 | Steimel |
| 2018/0044109 | A1 | 2/2018 | Butcher et al. |
| 2019/0087790 | A1 | 3/2019 | Flood |
| 2019/0159162 | A1 | 5/2019 | Hassan |
| 2019/0210798 | A1 | 7/2019 | Schultz |
| 2019/0325220 | A1 | 10/2019 | Wildgrube et al. |
| 2019/0385384 | A1 | 12/2019 | Romano et al. |
| 2020/0034785 | A1 | 1/2020 | Romano et al. |
| 2020/0082167 | A1 | 3/2020 | Shalom et al. |
| 2020/0193620 | A1 | 6/2020 | Armstrong et al. |
| 2021/0078799 | A1 | 3/2021 | Salinas et al. |
| 2021/0158308 | A1 | 5/2021 | Armstrong et al. |
| 2021/0326658 | A1 | 10/2021 | Swaroop et al. |
| 2021/0354911 | A1 | 11/2021 | Yhap et al. |
| 2022/0139126 | A1 | 5/2022 | Romano et al. |
| 2022/0229183 | A1 | 7/2022 | Chang |
| 2023/0230340 | A1 | 7/2023 | Swaroop et al. |
| 2023/0267784 | A1 | 8/2023 | Romano et al. |
| 2024/0087381 | A1 | 3/2024 | Romano et al. |

FOREIGN PATENT DOCUMENTS

| | | |
|---|---|---|
| KR | 10-2017-0109273 | 9/2017 |
| WO | WO 2017176855 | 10/2017 |
| WO | WO 2018189668 | 10/2018 |

OTHER PUBLICATIONS

CA Office Action issued in Canadian Application No. 2,969,939, dated Jul. 19, 2019, 3 pages.

Extended European Search Report in European Appln. No. 19840950.0, mailed on Sep. 10, 2021, 11 pages.

Extended European Search Report in European Appln No. 21793530.3, mailed on Jul. 3, 2024, 10 pages.

International Search Report and Written Opinion in International Appln. No. PCT/US2019/043771, mailed on Nov. 12, 2019, 10 pages.

International Search Report and Written Opinion in International Appln. No. PCT/US2021/022761, mailed on Jul. 9, 2021, 9 pages.

Liu et al., "Deep Learning Model Comparison for Vision-Based Classification of Full/Empty-Load Trucks in Earthmoving Operations," Applied Sciences, Nov. 2019, 9(22):1-20.

Pace, "Life Cycle Assessment Based Modeling of Organic Waste Residue Using Anaerobic Digestion and Composting," Dissertation for the degree of Doctor of Philosophy in Biological Systems Engineering, University of California, Jul. 2017, 133 pages.

Pekdur, "Autonomous Solid Waste Separation System Design," Thesis for the degree of Master of Science in Mechanical Engineering, Izmir Institute of Technology, Graduate School of Engineering and Sciences, Jun. 2006, 85 pages.

Rose et al., "A comparative life cycle assessment of diesel and compressed natural gas powered refuse collection vehicles in a Canadian city," Energy Policy, 2013, 52:453-461.

Sudha et al., "An Automatic Classification Method for Environment—Friendly Waste Segregation Using Deep Learning," 2016 IEEE International Conference on Technological Innovations in ICT For Agriculture and Rural Development, 2016, 6 pages.

REFUSE VEHICLE DUMP VERIFICATION SYSTEM AND APPARATUS

CLAIM OF PRIORITY

This application is a continuation of U.S. application Ser. No. 16/857,681, filed Apr. 24, 2020, which is a continuation of U.S. application Ser. No. 15/611,986, filed Jun. 2, 2017, now U.S. Pat. No. 10,633,180, which claims the benefit of U.S. Provisional Application No. 62/348,537, filed Jun. 10, 2016, both of which are incorporated herein by reference in their entirety.

FIELD OF THE INVENTION

The present invention relates to a method and device for positively identifying that a dump event has occurred into a refuse vehicle such as dumping a container from a front end loader or other refuse vehicle type and the system and method which at least assists in positively verifying that a dump event has occurred possibly at a particular location and/or with a particular container.

BACKGROUND OF THE INVENTION

Route software exists in the refuse industry to identify where a refuse vehicle is along their route. This software is usually viewed on a tablet computer in the case of a refuse vehicle. However, situations still exist whereby the driver may make an unauthorized pickup and/or fail to dump a particular container at a customer's location. Prior art techniques rely on manual record keeping, RFID tags on containers, imaging and/or semi-automated operator initiated triggers (i.e., manual push buttons, etc.). Unfortunately, many of these methods are prone to "rigging" and/or suffer from reliability issues.

Accordingly, an improved method and system for tracking and positively identifying if a container has been dumped, preferably a specific container, and/or at a specific location, is believed to be desirable in the market place.

SUMMARY OF THE INVENTION

It is a present object of many embodiments of the present invention to provide an improved system and/or method for confirming that a container is operably connected to a refuse vehicle and then dumped into the refuse hopper or body, possibly while recording at least the approximate location of the event.

Another object of many embodiments of the present invention is to provide a sensor for detecting the presence of a container connected to a refuse vehicle whether through electrical, electro-mechanical, mechanical, laser, radar, sonar, hydraulic, camera or other detector which can be utilized to preferably provide a signal to a processor for use in identifying that a container is connected to the refuse vehicle for dumping into the vehicle.

Accordingly, in accordance with a presently preferred embodiment of the present invention, a sensor or detector is provided which can be utilized to at least assist in detecting the presence of a refuse container to be dumped into a refuse vehicle, whether that sensor being mechanical, electrical, electro-mechanical, camera based, laser based, radar based, hydraulic based, and/or other system based sensor which can be utilized as understood by those ordinarily skilled in the art to at least assist in detecting a presence of the container.

Information from at least one sensor is preferably provided to a processor, possibly in combination with other input, such as input from the refuse vehicle related to the dumping action of the vehicle such as dumping of the front end loader and/or other information, such as whether or not a reverse gear is engaged, possibly together with time, date, GPS location, and/or other input.

Sensors can take various forms. It is presently anticipated that in the presently preferred embodiment a plunger may contact a container when fully inserted on the forks (which might not initially occur as the operator places the container on the forks but could be engaged as the container is lifted overhead with the container sliding back to the rear of the forks). For at least many embodiments, a plunger is pushed during some point during such a dump cycle.

After cycling the forks, for many embodiments, shifting the transmission to reverse and/or other gear positions may assist in providing an input to an algorithm at a processor to at least assist in positively identifying a container has been dumped into the refuse vehicle, preferably at a specific location.

BRIEF DESCRIPTION OF THE DRAWINGS

The particular features and advantages of the invention as well as other objects will become apparent from the following description taken in connection with the accompanying drawings in which.

DETAILED DESCRIPTION OF THE PREFERRED EMBODIMENTS

Figure 1:
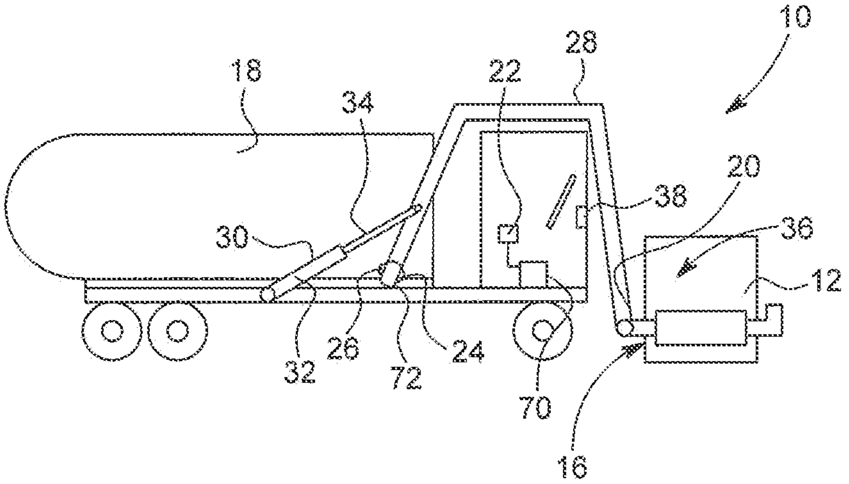
FIG. 1 is a side plan view of a refuse vehicle picking up a container.

FIG. 1 shows a refuse vehicle 10 of a presently preferred embodiment of the present invention picking up a container 12 as would often occur in the normal course of operations. The illustrated refuse vehicle 10 comes preferably equipped with some equipment not presently known prior art refuse vehicles 10. Specifically, although some refuse trucks have tablets or other computers 14 which may be used to provide route information, tablet 14 is preferably equipped with software to be able to receive input that can positively identify a container (possibly a particular container) is or was located on the forks 16 and a dump action took place into the refuse body 18 possibly at one or more particular locations.

Accordingly, in an embodiment of the presently preferred invention, the vehicle 10 or other portion of the system can positively verify that a container such as a particular container 12 has been serviced by a refuse collection vehicle 10.

Figure 2:
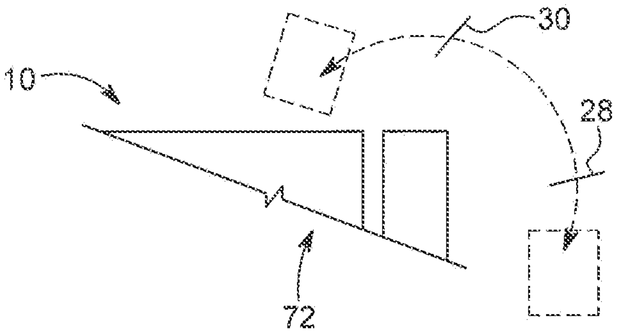
FIG. 2 is a side plan view of the vehicle and container combination of FIG. 1 in the process of dumping the container showing the path of travel of the container in the dump process.

A sensor such as sensor 20 can provide an input to a processor such as processor 22 possibly along with other input such as inputs from limit switches 24, 26 which may report the relative position such as angular positions 28 and 30 shown in FIG. 2 for lift arm 28 position such as the lift arm 28 proceeds through the dump cycle in shown in FIG. 2 possibly in combination with other factors such as the vehicle 10 being put in reverse after a dump cycle to then back away from the container 12.

Accordingly, processor 22 can use an algorithm to positively identify with somewhat significant accuracy that a container 12 is located on the fork 16 or other lifting apparatus or mechanism, identify the lifting or dumping action, such as by using inputs from the limit switches 24, 26 like dumping and then lowering the container 12 back to a normal position, and possibly receiving an input related to changing gear position of the transmission and/or other factors. The present algorithm has been found to provide repeatable results although there are certainly other inputs which may be utilized and certainly not only these inputs identified need be utilized for all embodiments.

For instance, some embodiments may use a hydraulic pressure, such as of the arm lift cylinder 30, such as sensor 32 to provide an input to the processor 22 in an effort to measure weight on the arm 16. Other hydraulic pressures and/or positions may be identified including a cylinder 30 being a smart cylinder so as to identify a relative position 28, 30 by position of the piston 34 and relative to cylinder 30 to provide input to processor 27.

In addition to having a mechanical sensor 20 as will be explained in further detail below, an RIFD (radio frequency identification device) could be utilized such as on container represented by device 36 could communicate with a sensor 38 such as on the vehicle to provide input of the proximity of the container 12 to the vehicle 10 such as shown or otherwise.

Also the sensor 38 could be one of a laser, radar, sonar, camera or other sensing device so as to be able to identify the presence of a container 12. It may be that the container 12 is only close enough to the sensor 38 during the lifting process so as to be able to read it so it would not provide false positive simply by driving by the container 12 for some embodiments or not.

Laser, radar, sonar and camera such as with digital recognition software can be employed for various embodiments as a sensor 38 which may also not only be able to identify that a container 12 is present on a lifting mechanism such as 16 but possibly also which specific container 12 is present such as by having a number predominantly displayed or other code or device (i.e. RFID tag or other device) on the container 12 which could be read by the camera or other device for comparison with the anticipated images by the software on the processor 22 or otherwise. Processor 22 may be independent from or integral with computer 14 for various embodiments.

Although a front end loader (FEC) is shown, other refuse vehicles could utilize similar technology such as side loaders with another lifting mechanism, rear loaders such as with a tip loader, or even front-loadable vehicles with or without an intermediate can. All of which could have sensor 20 connected to the vehicle 10, if not to the lifting mechanism, illustrated at lifting arm 28 and/or fork axle 56.

Figure 3:
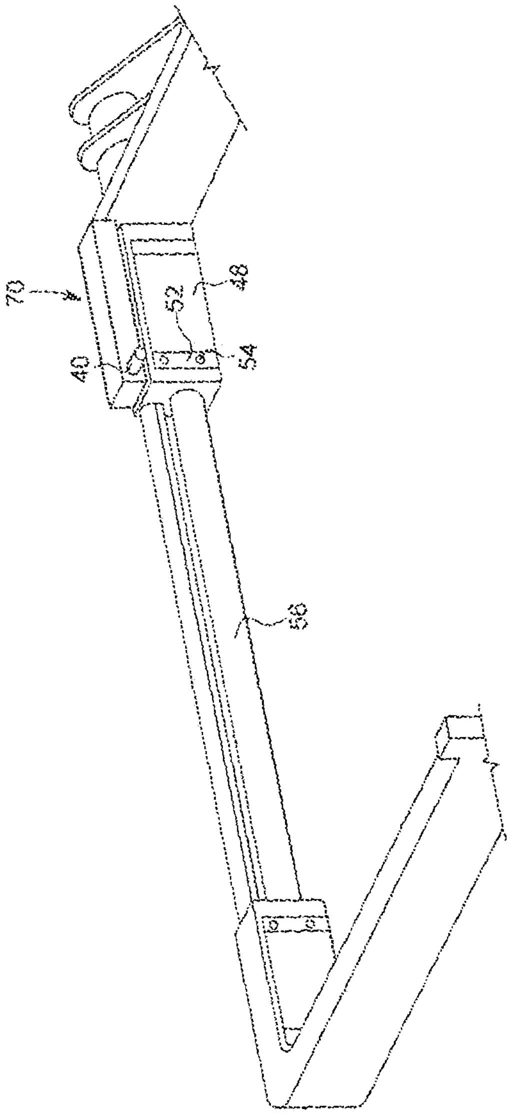
FIG. 3 is a front perspective view of the forks connected to the container showing a sensor of the first presently preferred embodiment connected forks.

FIG. 3 shows a mechanical type sensor 20 configuration which could be utilized with various embodiments. The sensor 10 may include a plunger 40 which may or may not initially contact container 12 when placed on the forks 16 as shown in FIG. 1. Specifically, it may be that the plunger 40 is depressed as the container 12 proceeds to be dump cycle such as shown in FIG. 2 or it may actually be contacted when the container 12 is engaged.

Figure 4:
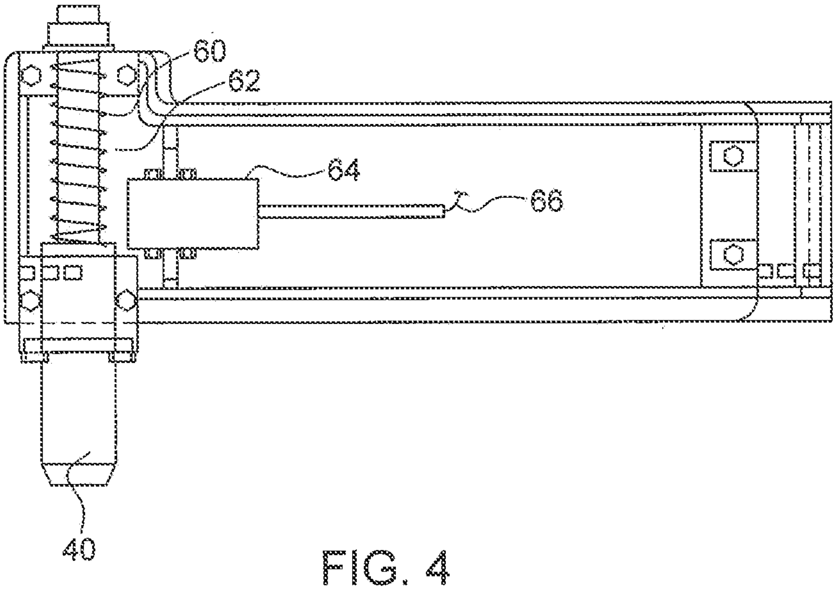
FIG. 4 is a top cut-away view of the sensor shown in FIG. 3.
Figure 5:
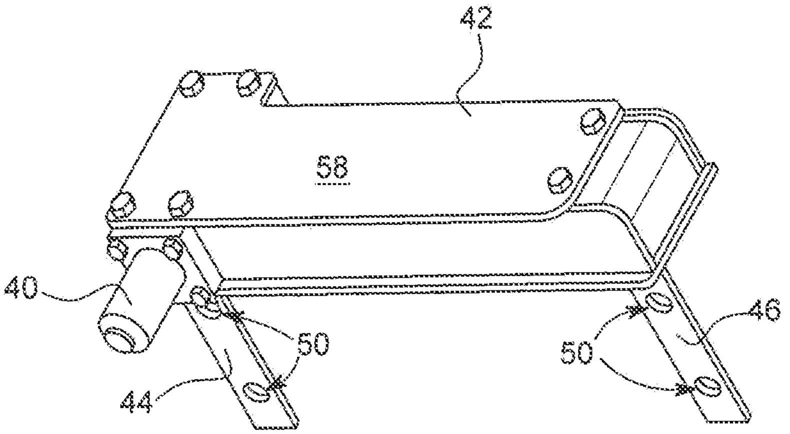
FIG. 5 is a front perspective view of the sensor shown in FIGS. 3 and 4.
Figure 6:
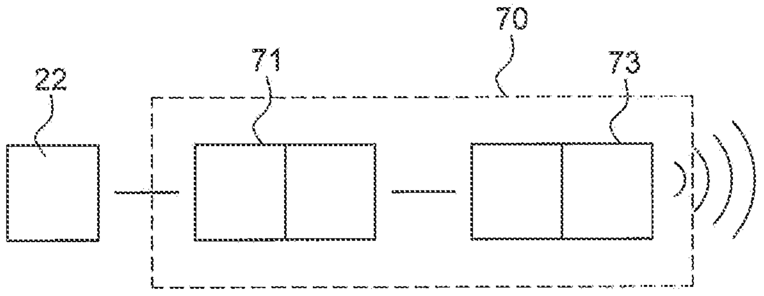
FIG. 6 is a top schematic view of a portion of the invention as shown in FIG. 1.

As can be seen from the illustrated embodiment with particular reference with FIG. 5 the sensor 20 may have a housing 42 which may have arms 44 and 46 which may cooperate and/or coincide with the connections for bumper 48 such as would provide bores 50 which would correlate with bores in the bumper mount 52 through which bolts 54 might extend through both of them so as to not only connect the bumper 48 to the fork axle 56 but also the sensor 20 to the bumper 48 and/or fork axle 56 as well. The housing 42 may have a cover 58 which is illustrated removed in FIG. 4 so as to expose a spring 60 about a guide rod 62 over which piston 40 can proceed against and over so the piston 40 moves linearly as restrained by guide rod 62 might be sensed by proximity switch 64 so as to provide input to the processor 22 while being biased away from such a position by spring 60 until a container 12 is sensed by the sensor 20. Housing 42 may be rather robust so as to protect the proximity switch 64 and associated wiring 66 which can direct a signal to the processor 22 unless a wireless connection can be maintained such as through various technologies available in the art.

The processor 22 may be able to receive input from the sensor 20 and/or 38 and possibly communicate existence of a positive dump event to computer 14 if not integral to the processor 20 and possibly coordinate an algorithm to possibly coordinate the presence of the container 12 but also preferably a dump cycle occurring such as could be interpreted by limit switches 24, 26 in a particular order as signals received in a particular order such as first from position correspond position 28 and then 30 and possible back to 28 and/or various positions of a smart cylinder 30 so as to identify that a dump has occurred. If not a part of the tablet 14, the processor 22 can provide a signal to the tablet or other computer 14 such as Bluetooth or otherwise. Processor may also receive input from a gear change of the vehicle 10 such as to reverse.

Communicating a signal in the presently preferred embodiment of the present invention for processor 22 to computer 14 may involve a mobile controller or processor which can provide a can dump signal across a J1939 bus. A J1936 to RS232 signal converter 71 can then provide a signal to a signal converter, such as an RS232 to Bluetooth signal converter 73 to then wirelessly provide a signal from wireless communicator 70 to tablet 14 if not provided in some other way (such as integral, hardwiring, etc.). Of course, hard wiring or other systems could certainly be an option for various embodiments particularly if processor 22 is not an integral part of the tablet or other computing device 14 on which preferably has route software thereon which would be programmed with specific container 12 locations.

While a mechanical type sensor is certainly preferable such as the mechanical/electrical sensor 20 as illustrated for sensor 20, there are certainly other sensors 20 or 38 which could be substituted therewith whether those may be able to sense a container 12 on the forks 16 such as by hydraulic pressure applied to the cylinder 30 or others. There may be other weight systems for weighing loads on fork 16.

This technology is not only applicable to front end loaders with a fork (FELs) 16 but also to side loaders, intermediate can constructions or even rear loading devices such as those having cart tippers and/or other systems or vehicles 10. Certainly the sensors such as sensor 20 and/or 38 can be located on various portions of the vehicle tend to accommodate these other various loading systems.

For one embodiment the data from the sensor such as sensor 20 and/or 38 is preferably combined in the form of an algorithm such as the lift positions 28 and 30 from either proximity switches, limit switches or other switches such as those associated with the pivot 72 or other positions. A reverse signal could be provided by the transmission such as across the J1939 bus to processor 22 so as to identify that the vehicle 10 is then backing away from the refuse container 12. Other algorithms may not require all these features and another algorithm may still use other inputs for various embodiments.

Furthermore, although processor 22 shows a mobile controller as a processor 22, there is certainly other controllers available on the marketplace which could provide similar capabilities possibly even portable computers such as tablets and/or various other technologies. Furthermore, although the preferred embodiment uses a relatively sophisticated controller 22 others which may be provided on a new vehicle or otherwise and may receive inputs and/or control various functions apart from this feature.

Other embodiments may have a stand-alone module with a processor 22 installed for the purposes described herein as a retrofit or otherwise. Furthermore, although the can dump signal may be provided directly from the sensors such as the cylinder or limit switch, it may also be provided indirectly such as in the case of an intermediate can from joystick position when the joystick is utilized by the operator to dump the can. Accordingly, the can dump feature may be directly or indirectly sensed, such as with the proximity limits which is 24, 26 and/or indirectly such as by user input such as a dump can button pushed on the dashboard, using joysticks and/or other features available on various refuse vehicles 10 and operations therewith.

The positive service verification is different from a cycle count which merely counts the number of times that the arms 28 rotate as there is no definitive way to know with cycle count whether or not a container 12 was dumped or not at a location. The route software on computer 14 can receive a can dump signal to at least assist in identifying which container 12 was dumped for positive verification of a specific container and/or a specific location having a dump event.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

What is claimed is:

1. A dump verification system, comprising:
- a lift supported by a chassis of a refuse vehicle, the lift configured to selectively engage a container and move through a dump cycle while engaged with the container;
- a plurality of sensors supported by the chassis, the plurality of sensors comprising a radar sensor positioned on the chassis to scan at least a portion of the container during the dump cycle of the lift; and
- one or more processors configured to identify, based on at least a portion of received input from the radar sensor, a presence of the container only when a proximity between the container and the radar sensor is such that there exists an engagement of the container by the lift during the dump cycle.

2. The dump verification system of claim 1, further comprising a data bus supported by the chassis, the data bus configured to transmit data relating to the refuse vehicle.

3. The dump verification system of claim 2, wherein the one or more processors are configured to execute one or more algorithms based on at least a portion of the data transmitted across the data bus.

4. The dump verification system of claim 1, wherein the one or more processors are further configured to record at least one of a time and date of dumping of the container into a hopper of the refuse vehicle.

5. The dump verification system of claim 1, wherein the radar sensor is a first sensor, wherein the dump verification system further comprises a second sensor configured to detect an angular position of at least a portion of the lift during the dump cycle, and wherein the one or more processors are configured to execute one or more algorithms based on at least a portion of the input from the second sensor to determine that the dump cycle was performed by the lift while the container was engaged by the lift.

6. The dump verification system of claim 5, wherein the input from the second sensor comprises one or more of output from at least one limit switch providing data related to a dumping action of the lift or data from a transmission of the refuse vehicle after receiving specific data from the at least one limit switch.

7. The dump verification system of claim 6, wherein the data from the transmission further comprises shifting into reverse gear.

8. The dump verification system of claim 5, wherein the input from the second sensor further comprises data from at least one of a transmission of the refuse vehicle, hydraulic pressure related to the lift, weight sensed relative to the lift, or position data of a cylinder of the lift.

9. The dump verification system of claim 1, wherein an input from the plurality of sensors further comprises one or more of data sensed from the container by at least one of a laser, a radar, a sonar, or a camera or a GPS location related to the container.

10. The dump verification system of claim 1, wherein the refuse vehicle is one of a front end loader, side loader, rear loader, or front loader with an intermediate can.

11. A refuse vehicle having positive dump verification of refuse containers, the refuse vehicle comprising:
- a lift configured to selectively engage a container and move through a dump cycle while engaged with the container to dump refuse from the container into a hopper connected to the refuse vehicle;
- a plurality of sensors comprising:
  - a first sensor responsive to a presence of a container engaged by the lift, the first sensor comprising a housing and a piston, the piston configured to, when the container is engaged by the lift, move linearly relative to the housing in response to contact with the container; and
  - a second sensor positioned on the chassis to scan at least a portion of the container during the dump cycle of the lift, wherein the second sensor is a radar sensor; and
- one or more processors configured to determine, based on at least a portion of received input from the plurality of sensors, that the dump cycle was performed by the lift while the container was engaged by the lift, wherein the one or more processors are configured to identify, based on at least a portion of received input from the radar sensor, a presence of the container only when a proximity between the container and the radar sensor is such that there exists an engagement of the container by the lift during the dump cycle.

12. The refuse vehicle of claim 11, further comprising a third sensor configured to detect an angular position of at least a portion of the lift during the dump cycle.

13. The refuse vehicle of claim 11, wherein the one or more processors are configured to identify the container based on input from the radar sensor.

14. The refuse vehicle of claim 11, wherein the lift comprises a crossbar extending along a width of the refuse vehicle and a bumper supported by the crossbar, and wherein the housing of the first sensor is coupled to the bumper, and wherein the crossbar comprises a fork axle.

15. The refuse vehicle of claim 14, wherein the housing of the first sensor is mounted directly to the bumper.

16. The refuse vehicle of claim 11, wherein the first sensor further comprises a guide rod configured to constrain the piston to linear movement, and wherein the piston is biased against a surface of the housing by spring coaxially aligned with the guide rod.

17. The refuse vehicle of claim 11, wherein the first sensor further comprises a proximity switch mounted within the housing to detect movement of the piston.

18. A method of positive dump verification of refuse containers into refuse vehicles, the method comprising:

providing a lift configured to be supported by a chassis of a refuse vehicle and to selectively engage a container and move through a dump cycle while engaged with the container to dump refuse from the container into a hopper connected to the refuse vehicle;

providing a plurality of sensors comprising a radar sensor positioned on the chassis and responsive to the engagement of the container by the lift; and providing one or more processors configured to identify, based on at least a portion of received input from the radar sensor, a presence of the container only when a proximity between the container and the radar sensor is such that there exists an engagement of the container by the lift during the dump cycle.

19. The method of claim 18, wherein the radar sensor is a first sensor, and wherein the plurality of sensors further comprises a second sensor responsive to an angular position of at least a portion of the lift during the dump cycle.

20. The method of claim 18, wherein the method is performed with route software, and an alert is provided: i) if the container is missed during a route, and/or ii) if the container is dumped and the dumping was not expected by the route software.

* * * * *